United States Patent [19]

Warner et al.

[11] Patent Number: 5,037,267

[45] Date of Patent: Aug. 6, 1991

[54] LOAD BALANCING MECHANISM

[75] Inventors: William G. Warner, Grosse Pointe Woods; Joseph G. Tranchida, Roseville, both of Mich.

[73] Assignee: Protomark Corporation, Fraser, Mich.

[21] Appl. No.: 208,237

[22] Filed: Jun. 17, 1988

[51] Int. Cl.$^5$ .............................................. B25G 1/00
[52] U.S. Cl. ................................. 414/744.6; 414/719; 414/917; 414/718; 254/46; 248/324; 901/15; 901/48
[58] Field of Search ...................... 414/749, 680, 744.6, 414/917, 541, 542, 543, 546, 549, 550, 560, 718, 719, 728, 729; 901/15, 48; 254/46; 248/343, 327, 324; 212/184, 205

[56] References Cited

U.S. PATENT DOCUMENTS

| | | | |
|---|---|---|---|
| 4,226,567 | 10/1980 | Van Orsdale, Jr. | 414/917 |
| 4,507,046 | 3/1985 | Sugimoto et al. | 414/735 |
| 4,801,235 | 1/1989 | Rauschdorf | 414/917 X |

Primary Examiner—Robert J. Spar
Assistant Examiner—Donald W. Underwood
Attorney, Agent, or Firm—Brooks & Kushman

[57] ABSTRACT

A load balancing mechanism (10) disclosed includes an arm (12) including first and second arm portions (14,26). A support post (22) is rotatable about its vertical axis A and supports arm (12) by first arm portion (14) for pivotal movement in a vertical plane and also for rotational movement about axis A. First arm portion (14) includes parallel spaced members (16,16') defining a parallel linkage arrangement. A piston and cylinder balancing arrangement (38) connects post (22) and first arm portion (14) allowing upward and downward pivotal movement of arm (12) and is responsive to such upward and downward pivotal movement to provide balancing of a load thereon. The second arm portion (26) can be longitudinally moved relative to a second mount (32) to increase or decrease the length of arm (12) without having to change the force applied via balancing arrangement (38) to maintain balancing of the load.

13 Claims, 4 Drawing Sheets

LOAD BALANCING MECHANISM

TECHNICAL FIELD

This invention relates to a load balancing mechanism to facilitate handling of heavy tools and parts by a worker in assembly operations.

BACKGROUND ART

Conventional load balancing mechanisms are used by a worker to handle equipment such as heavy air driven tools or to aid in placement for mounting of parts in assembly line type operations, etc. These load balancing mechanisms supply supporting forces in a vertical direction to counter gravitational force for supporting a given load and also structure to resist torque and vibration associated with certain tool operations. Typical load balancing mechanisms include a two-piece articulated arm of a straight cross section pivotally connected to a support post about which the arm is rotatable. The arm is pivotal for movement in a vertical plane and also rotatable about an axis of rotation horizontally displaced from an axis of the support post. A hinged connection allows the two sections of the arm to be selectively moved by a worker for placement of a load located at a distal end of one of the arms within the reach of the articulated arm.

In this conventional arrangement of the load balancing mechanism, deflection is created in the support post by the weight of the arm. This deflection is increased by the application of a load on the arm. This deflection establishes a "home" position, due to the combined effect of deflection of the axis of rotation and the axis of rotation being displaced from the axis of the support post, which is at a lowest elevational position for the arm about the post. The arm drifts to this "home" position if left uncontrolled or unattended. This drift is further exaggerated by the hinged construction of the articulated arm and makes controlling the arm mandatory.

The straight cross sectional shape of the articulated arm also necessitates applying a greater lifting force to the arm to counter the weight of any given load applied to the end of the arm as the greatest bending movement occurs at the connection of the support post and arm.

DISCLOSURE OF INVENTION

An object of the present invention is to provide an improved load balancing mechanism for use by a worker. The improved load balancing mechanism eliminates drift associated with conventionally mounted support arms when the arm is left uncontrolled or unattended.

A further object of the invention is to provide a support arm that requires the application of less vertical force than needs to be applied to a conventional support arm to support a given load.

In carrying out the above objects and other objects of the invention, a load balancing mechanism constructed in accordance with the present invention comprises a first arm portion being defined by a pair of parallel spaced members having first and second ends arranged to form a parallel linkage arrangement between said first and second ends and a post having a substantially vertical axis. A first mount mounts the first end of the arm to the post and provides pivotal movement of the second end of the arm about the first end in a vertical plane. A second arm portion is of an elongated shape having first and second ends and also having a longitudinal axis. The second arm portion is mounted by a second mount to the second end of the first arm portion. The longitudinal axis thereof is supported in a plane substantially perpendicular to the axis of the post and the second arm portion forms an extension of the first arm portion.

A holder, for attaching a load thereto, is mounted on a distal end of the second arm portion and a balancing means, such as a fluid actuable piston and cylinder balancing arrangement, connects the post and the arm, between the first and second ends of said first arm portion, to allow upward and downward pivotal movement of the second end of the arm about the first end by an operator. The piston and cylinder arrangement also provide selective movement of the load held by the holder and operation in response to such upward and downward pivotal movement to provide counter gravitational balancing during such upward movement and a similarly controlled balancing of such downward movement.

The post which supports the arm is rotatable about its vertical axis to allow an operator to swing the arm in a horizontal plane about the vertical axis of the post. The load balancing mechanism is provided with a base and a bearing member adjacent the base rotatably supporting the post for the rotational movement about its vertical axis on the base. The base is movable and preferably comprises a trolley.

In the preferred embodiment of the invention, the second arm portion is repositionable along its longitudinal axis with respect to the second mount for adjusting the length of the arm. As an option, the second mount includes a vertical swivel to provide relative rotational movement of the second arm portion in a plane generally perpendicular to the vertical axis.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
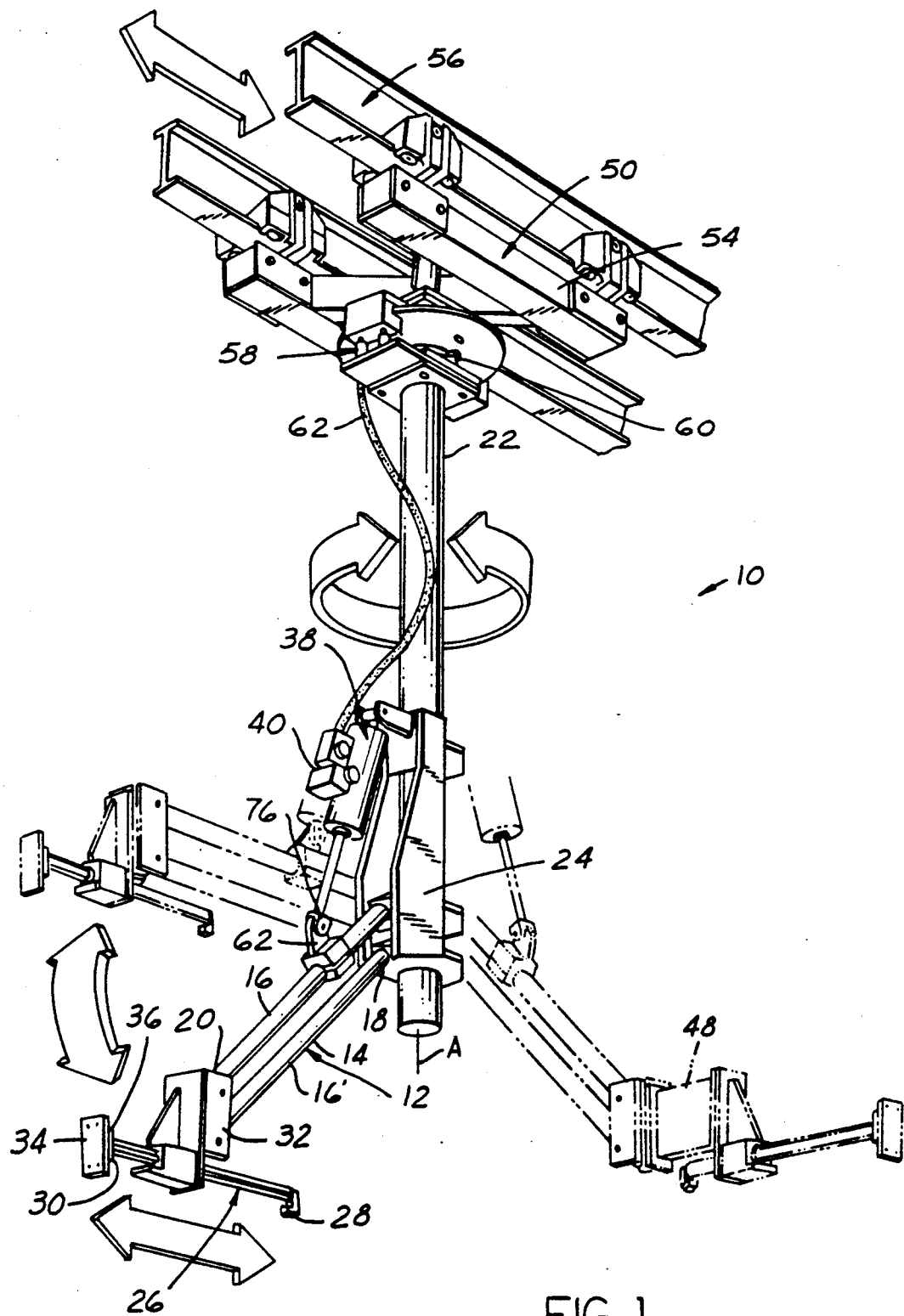
FIG. 1 is a perspective view of a load balancing mechanism constructed in accordance with the present invention and mounted on an overhead bridge and trolley arrangement illustrating positions of movement show in phantom.

Referring to FIG. 1 of the drawings, a load balancing mechanism constructed in accordance with the present invention is generally indicated by reference numeral 10 and is used by a worker as a power assist in handling tools and for lifting and mounting parts in manufacturing assembly type operations. As is hereinafter more fully described, the load balancing mechanism 10 provides power assisted movement in a vertical direction and is manually controllable by the worker and movable in a horizontal plane. The load balancing mechanism 10 maintains its load, whether a tool or part, in the last spacial position in which it was left by a worker. The load balancing mechanism 10 also reduces the amount of force required to lift the load as the lifting force is not used to counteract moments due to longitudinal positioning of a load.

Figure 2:
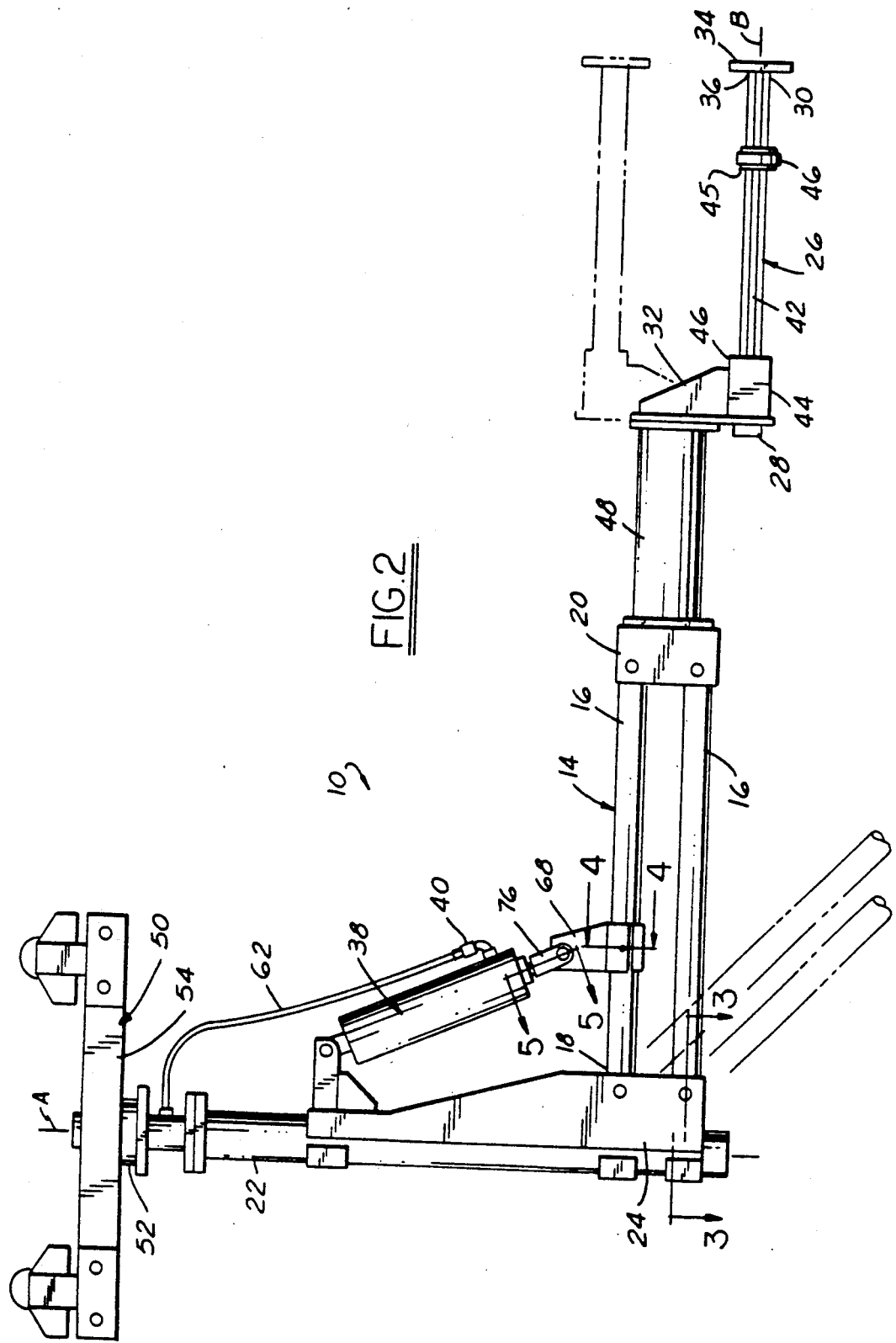
FIG. 2 is a side elevational view of the load balancing mechanism illustrating an arm, a post and a piston and cylinder balancing arrangement.

As shown in FIGS. 1 and 2 of the drawings, the load balancing mechanism 10 comprises an arm 12 including a first arm portion 14. The first arm portion 14 is defined by a pair of parallel spaced members 16,16' having first and second ends 18,20 arranged to form a parallel linkage arrangement. A post 22 having a substantially vertical axis A supports the arm 12. A first mount 24 mounts the first end 18 of the first arm portion 14 to the post 22 thereby providing a rigid connection of the first arm portion to the post that allows pivotal movement of the second end 20 of the first arm portion about the first end 18 in a vertical plane. Post 22 is rotatable about its vertical axis A thereby allowing arm 12 to be swung in a horizontal plane about the vertical axis A. Rotation of the post 22 about vertical axis A eliminates the drifting effect typically associated with conventional load balancing mechanisms because pivoting occurs adjacent the mounting of the post where there is no deflection in the vertical direction. A given load on arm 12 remains in the same horizontal plane as the arm and post 22 are rotated through 360°.

With continued reference to FIGS. 1 and 2, a second arm portion 26 of an elongated shape has first and second ends 28,30 and also has a longitudinal axis B. A second mount 32 mounts the second arm portion 26 to the second end 20 of said first arm portion 14 and supports the longitudinal axis B thereof in a plane substantially perpendicular to the axis A of said post to thereby form an extension of the first arm portion 14. A holder 34, mounted on a distal end 36 of the second arm portion 26, is provided for attaching a tool or the like thereto. A fluid actuable piston and cylinder balancing arrangement 38 connect the post 22 and first arm portion 14, between the first and second ends 18,20 allowing upward and downward pivotal movement of the second end 20 of the first arm portion about the first end 18. An operator can selectively move the tool mounted on holder 34 and operation in response to such upward and downward pivotal movement is provided by the piston and cylinder balancing arrangement 38 to provide a counter gravitational balancing during such upward movement and a similarly controlled balancing of such downward movement.

The second mount 32 has a generally vertical axial orientation that is substantially parallel to the axis A of the post 22. The second mount 32 maintains its axial orientation as the first arm portion 14 is pivoted in the vertical plane because of the parallel linkage arrangement of the first arm portion.

The second arm portion 26 is repositionable along its longitudinal axis B with respect to the second mount 32 for adjusting the length or reach of arm 12. The parallel linkage arrangement of first arm portion 14 wherein the parallel spaced members 16,16' are illustrated as being tubular in cross-section, renders the amount of counterbalancing force required by cylinder 38 to balance the arm essentially independent of the longitudinal positioning of the second arm portion 26 for a given load supported on holder 34. Thereby, in any given horizontal positioning of the second mount 32, the second arm portion 26 can be longitudinally moved relative to the second mount to increase or decrease the length of the arm 12 without any increase or decrease in the counterbalancing force required to be applied via the piston and cylinder balancing arrangement 38 to maintain equilibrium of the load. As second arm portion 26 is extended or retracted, the varying moments about the second mount 32 are communicated through the parallel spaced members 16,16' to the first mount 24 and not to the piston and cylinder balancing arrangement 38. Thus, a workman using the arm need only overcome the friction therein to raise or lower the load and will not need to apply a greater or lesser force to raise or lower the load depending on how far out arm portion 26 has been extended. The piston and cylinder arrangement 38 includes a pressure controller 40 of the kind disclosed in U.S. Pat. No. 4,591,128 for maintaining a generally constant pressure for equilibrium balancing of the load on the second arm portion 26, or adjustment of the pressure to accommodate variations in weight of the load carried by holder 34.

In a preferred embodiment, second arm portion 26 includes longitudinal splines 42 thereon. Second mount 32 includes a complementary grooved linear bearing 44 for receiving splines 42 to prevent rotation of second arm portion 26 about longitudinal axis B and also for providing for longitudinal placement of second arm portion 26. In addition, a grooved insert 45 of a nonmetallic material such as neoprene and a collar clamp 46 which retains the grooved insert is positionable on the second arm portion 26. The grooved insert 45 extends beyond the collar 46 and thereby acts as a bumper and stop to limit the amount of longitudinal travel of the second arm portion 26 with respect to the second mount 32.

As shown in FIG. 2, an extension member 48 is optionally mountable between the second end 20 of said first arm portion 14 and the second mount 32 to further increase the length or reach of arm 12.

Referring still to FIGS. 1 and 2, load balancing mechanism 10 includes a base 50 and a bearing member 52 adjacent the base rotatably supporting the post 22 for its rotational movement about vertical axis A. Preferably, base 50 is a trolley 54 supported for movement on a bridge 56 for overhead movement of the load balancing mechanism 10. An optional brake 58 is provided on base 50 to allow the worker to control the rotational movement of post 22 when large loads are supported by holder 34. A stop 60 is also provided on base 50 to limit the number of degrees of rotation post 22 can be rotated.

Figure 3:
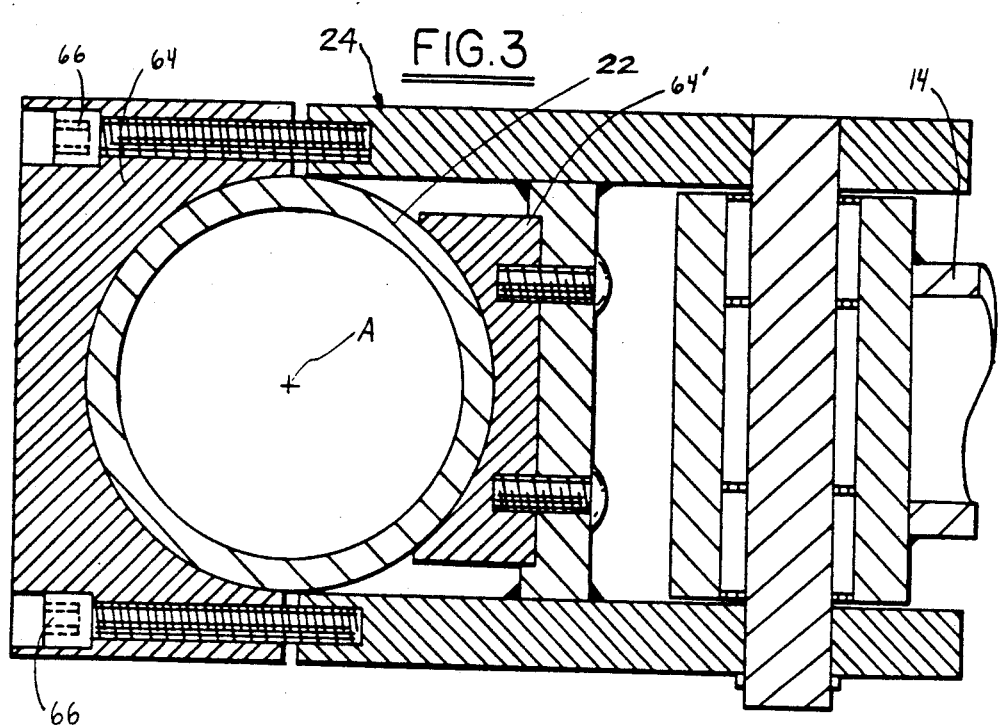
FIG. 3 is a sectional view taken along lines 3—3 in FIG. 2 illustrating a rigid, yet adjustable connection for mounting the arm portion to the post.

FIG. 3 of the drawings illustrates the rigid connection of the first arm portion 14 to post 22 by means of first mount 24. Mount 24 includes two collar portions 64,64' joined together by fasteners 66,66' which allow mount 24 and arm 12 to be vertically repositioned about post 22 by simply readjusting the fasteners.

Figure 4:
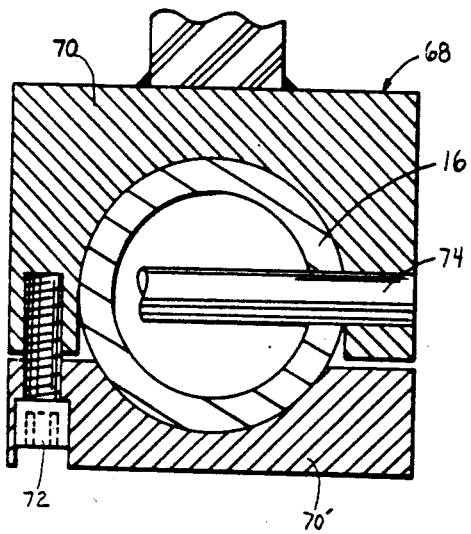
FIG. 4 is a sectional view taken along lines 4—4 in FIG. 2 illustrating a connector for mounting one end of a fluid actuable piston and cylinder balancing arrangement.

FIG. 4 illustrates a connector 68 connecting the piston and cylinder balancing arrangement 38 to one of the tubes defining the spaced member 16 of the first arm portion 14. Connector 68 is a split collar connector including collar portions 70,70'. Fastener 66 and pin 68 assure that connector 68 is in the proper position on parallel spaced member 16.

Figure 5:
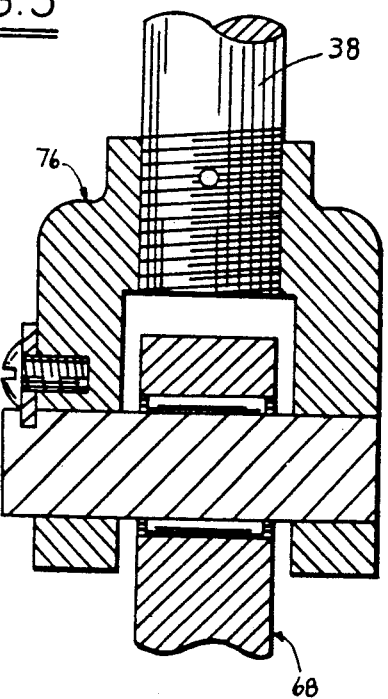
FIG. 5 is a sectional view taken along lines 5—5 in FIG. 2 illustrating a clevis on one end of the piston and cylinder balancing arrangement and a connection to the connector.

FIG. 5 illustrates a clevis 76 for connecting the piston and cylinder balancing arrangement 38 to connector 68.

Figure 6:
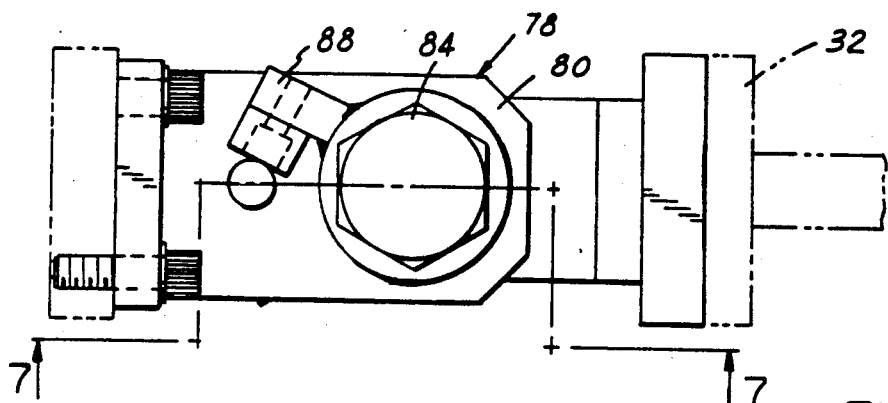
FIG. 6 is a top view of a second mount including a vertical swivel and a stop to limit rotation of a second arm portion.
Figure 7:
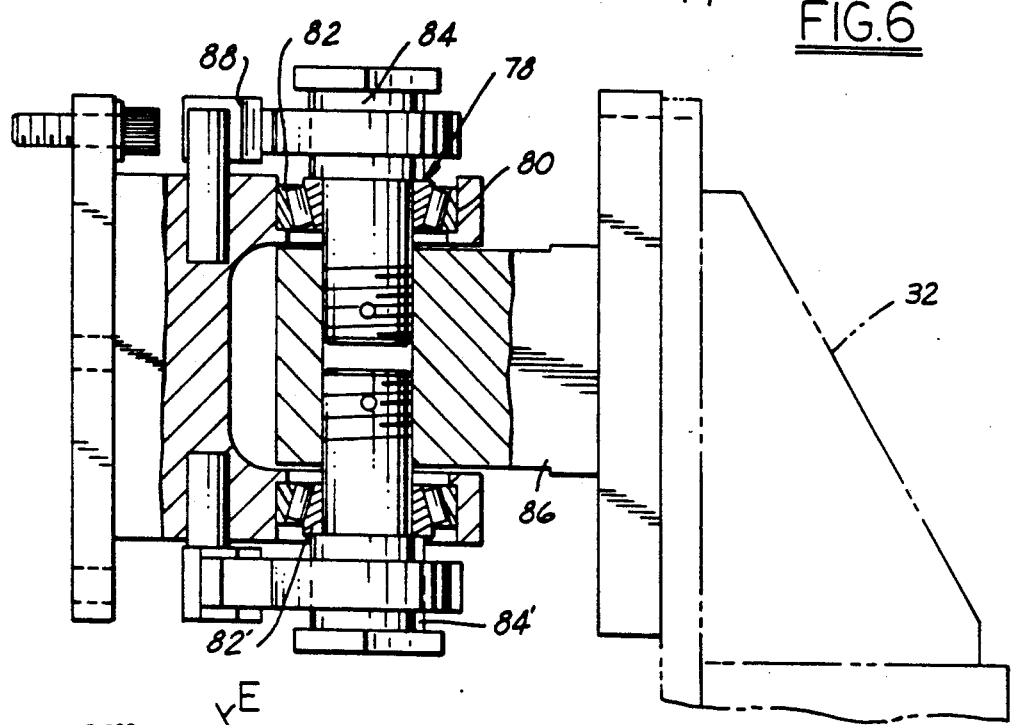
FIG. 7 is a sectional view taken along lines 7—7 in FIG. 6 illustrating the swivel connection.

FIGS. 6 and 7 illustrate an optional vertical swivel arrangement 78 included on second mount 32 to provide relative rotational movement of second arm portion 26 to said first arm portion 14 in a plane generally perpendicular to the vertical axis A. Vertical swivel arrangement 78 includes a clevis 80 having bearings 82,82' therein supporting threaded axle shafts 84,84' threadably secured in a tongue 86 on the second mount 32. An adjustable stop 88 is provided on one of the threaded axle shafts 84 to limit the rotation of the second arm portion 26 about the second end 20 of the first arm portion 14.

Figure 8:
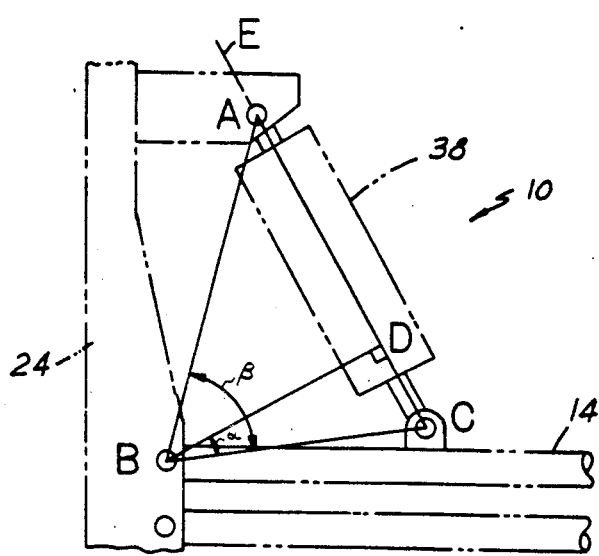
FIG. 8 is a partial side view of the mechanism illustrating the geometrical relationship between the post, the first arm portion, and the piston and cylinder balancing arrangement.

In FIG. 8 of the drawings, the preferred geometry between the first arm portion 14, the post 22, and the piston and cylinder balancing arrangement 38 is illustrated. An angle $\beta$ is formed between a first line segment BC, extending between the first mount 24 at the pivot point B of said first arm portion 14 and a point C where the piston and cylinder balancing arrangement 38 connects to the first arm portion, and a second line segment BA, extending between the first mount and the pivot point of said first arm portion 14 and a point A where the piston and cylinder balancing arrangement connects to the post 22, and that angle $\beta$ is greater than 40°. An angle $\alpha$ is formed between a third line segment BD extending between the first mount 24 at the pivot point B of the first arm portion 14 and a point D where the third line segment intersects a longitudinal axis E of the piston and cylinder balancing arrangement 38 at 90°, and the second line segment BC and that angle $\alpha$ is less than 30°. This geometrical relationship allows a given load to be balanced by a generally constant pressure in the piston and cylinder balancing arrangement 38 through vertical displacement of the first arm portion 14 within the given range of angle $\alpha$.

While the best mode for carrying out the invention has been described in detail, those familiar with the art to which this invention relates will recognize various alternative designs and embodiments for practicing the invention as defined by the following claims.

What is claimed is:

1. A load balancing mechanism comprising:
   an arm including a first arm portion;
   said first arm portion being defined by a pair of upper and lower parallel spaced members having first and second ends arranged to form a parallel linkage arrangement between said first and second ends;
   a post having a substantially vertical axis;
   a first mount for mounting said first end of said first arm portion to said post and providing pivotal movement of said second end of said arm portion about said first end in a vertical plane;
   a second arm portion having first and second ends;
   a second mount for mounting the first end of said second arm portion to said second end of said first arm portion;
   said second arm portion being extensible and retractable to move the second end of the second arm portion toward or away from said second mount in a plane substantially perpendicular to the axis of said post to extend or retract the reach of the arm;
   a constant force balancing means connected between said post and said first arm portion between said first and second ends thereof for equilibrium balancing upward and downward pivotal movement of said second end of said first arm portion about said first end despite extension or retraction of said second arm portion to move a load carried by the holder farther from or closer to said post;
   an angle $\beta$ formed between a first line segment, extending between said first mount at the pivot point of said upper spaced parallel member of said first arm portion, and a point where the balancing means connects to said upper spaced parallel member of said first arm portion, and a second line segment, extending between said first mount at the pivot point of said upper spaced parallel member of said first arm portion and a point where the balancing means connects to said post; said angle being greater than 40°; and
   an angle $\alpha$ formed between a third line segment extending between said first mount at the pivot point of said upper spaced parallel member of said first arm portion and a point where said third line segment intersects a longitudinal axis of said balancing means at 90°, and said first line segment; said angle A being less than 30°.

2. A mechanism as in claim 1 wherein said second mount has a generally vertical axial orientation substantially parallel to the axis of said post and said second mount maintains its orientation as said first arm portion is pivoted.

3. A mechanism as in claim 1 wherein said balancing means is a piston and cylinder arrangement including a pressure controller for maintaining a constant pressure for equilibrium balancing of a given load carried by said holder.

4. A mechanism as in claim 1 wherein said parallel spaced members are tubular in cross section.

5. A mechanism as in claim 1 wherein said first mount is retractable along the vertical axis of said post.

6. A mechanism as in claim 1 wherein said second arm portion is extensible or retractable along a longitudinal axis lying in a plane substantially perpendicular to the axis of said post for adjusting the reach of said arm, and said constant force balancing means comprises a fluid pressure piston and cylinder arrangement having a pressure controller for maintaining a constant pressure for equilibrium balancing a given load regardless of the longitudinal extension or retraction of said second arm portion.

7. A mechanism as in claim 6 wherein said second mount includes a vertical swivel to provide relative rotational movement of said second arm portion to said first arm portion in a plane generally perpendicular to said vertical axis.

8. A mechanism as in claim 7 further including an extension member mountable between said second end of said first arm portion and said second mount to further increase the length of said arm.

9. A mechanism as in claim 5 further including a base and a bearing member adjacent said base rotatably supporting said post for rotational movement about a vertical axis on said base.

10. A mechanism as in claim 9 wherein said base is movable.

11. A mechanism as in claim 10 wherein said base is a trolley.

12. A mechanism as in claim 11 further including a bridge for mounting said trolley thereto for overhead movement of said mechanism.

13. A mechanism as in claim 2 wherein said second arm portion is extensible or retractable along a longitudinal axis lying in a plane substantially perpendicular to the axis of said post for adjusting the reach of said arm, and said constant force balancing means comprises a fluid pressure piston and cylinder arrangement having a pressure controller for maintaining a constant pressure for equilibrium balancing a given load regardless of the longitudinal extension or retraction of said second arm.

* * * * *

UNITED STATES PATENT AND TRADEMARK OFFICE
CERTIFICATE OF CORRECTION

PATENT NO. : 5,037,267
DATED : August 6, 1991
INVENTOR(S) : William G. Warner and Joseph G. Tranchida It is certified that error appears in the above-indentified patent and that said Letters Patent is hereby corrected as shown below:

Column 6, between lines 8 and 9 insert the following paragraph:

a holder mounted on the second end of said second arm portion for attaching a load thereto;

Signed and Sealed this

Eighth Day of June, 1993

Attest:

Attesting Officer

MICHAEL K. KIRK

Acting Commissioner of Patents and Trademarks